US012140295B1

(12) United States Patent
Xu et al.

(10) Patent No.: US 12,140,295 B1
(45) Date of Patent: Nov. 12, 2024

(54) LIGHT BODY CONNECTING STRUCTURE, LIGHT GROUP, AND ASSEMBLING METHOD OF LIGHT GROUP

(71) Applicant: JIANGMEN CITY SHENGDA LIGHTING CO., LTD., Jiangmen (CN)

(72) Inventors: Xiaojun Xu, Jiangmen (CN); Haiyan Xu, Jiangmen (CN); Caiju Sun, Jiangmen (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/407,350

(22) Filed: Jan. 8, 2024

(30) Foreign Application Priority Data

Nov. 27, 2023 (CN) ......................... 202311602290.2

(51) Int. Cl.

| | |
|---|---|
| ***F21V 21/005*** | (2006.01) |
| ***F21S 6/00*** | (2006.01) |
| ***F21V 17/08*** | (2006.01) |
| ***F21V 23/00*** | (2015.01) |
| ***F21Y 105/16*** | (2016.01) |
| ***F21Y 107/30*** | (2016.01) |

(52) U.S. Cl.
CPC ............ *F21V 21/005* (2013.01); *F21S 6/005* (2013.01); *F21V 17/08* (2013.01); *F21V 23/001* (2013.01); *F21Y 2105/16* (2016.08); *F21Y 2107/30* (2016.08)

(58) Field of Classification Search
CPC ...... F21V 21/005; F21V 17/08; F21V 23/001; F21V 23/002; F21S 6/005; F21Y 2107/30
USPC .......................................................... 362/219
See application file for complete search history.

(56) References Cited

U.S. PATENT DOCUMENTS 11,747,002 B1 * 9/2023 Xu ........................ F21V 23/001
362/249.14
2004/0233668 A1 * 11/2004 Telfer ........................ F21S 4/10
362/249.16

FOREIGN PATENT DOCUMENTS

CN 117307999 A * 12/2023

* cited by examiner

*Primary Examiner* — Laura K Tso

(57) ABSTRACT

A light body connecting structure, a light group, and an assembling method of the light group are provided. The light body connecting structure includes a wiring terminal electrically connected with a light body and a wire. The wiring terminal includes a terminal body and a plug assembly. The terminal body is matched with any opening of a lampshade. The plug assembly is connected with a first end of the terminal body. One end of the wire passes through a second end of the terminal body and is electrically connected with the plug assembly. The plug assembly is connected with the terminal body, so that the plug assembly is connectable to lampshades of different sizes, and the light body connecting structure is adapted and mounted with a light body in any of the lampshades, which is versatile and reduces production cost.

20 Claims, 14 Drawing Sheets

LIGHT BODY CONNECTING STRUCTURE, LIGHT GROUP, AND ASSEMBLING METHOD OF LIGHT GROUP

TECHNICAL FIELD

The present disclosure relates to a technical field of light body connection, and in particular to a light body connecting structure, a light group, and an assembling method of the light group.

BACKGROUND

A light group is formed by connecting lamps or lighting equipment together and assembling them into a certain shape. By controlling the light group, the lamps or the lighting equipment are allowed to work together or to uniformly adjust brightness and colors thereof. A shape of the light group is determined according to different scenes and different lighting effects of the light group are created for different scenes. For instance, the shape of the light group, a brightness, a color, etc. of the light group are adjustable to meet needs of different scenes.

In the prior art, the Chinese patent application No. CN202221840737.0 discloses an internally threaded lampshade connecting structure, a light body and a light string, which disclose a lampshade that is integrally formed. Lengths of two terminals thereof inserted into the lampshade are fixed. An overall length of the two terminals after the two terminals are plugged into the light body matches a distance between the two openings of the lampshade. Then, the two terminals are respectively connected with the two openings of the lampshade to enable the light body being fixed in the lampshade. Therefore, when producing the terminals, it is necessary to control a length of each of the terminals, so that the overall length of the two terminals after the two terminals are plugged into the light body is neither too long nor too short. Therefore, lampshades of different sizes need to be adapted to different lamp bodies or different terminals, and different production lines need to be added, which increase quality control cost and production line cost. Moreover, when plugs configured to dock with the terminals are disposed on the light body, and angles of the plugs are multi-dimensional and lengths of the plugs are different, different terminals need to be provided to match the plugs, which increases management cost of different terminals. Therefore, there is an urgent need for a universal terminal with adjustable plug length to reduce the production cost.

SUMMARY

In view of defects in the prior art, an object of the present disclosure is to provide a light body connecting structure having wiring plug with an adjustable length. A plug assembly thereof is connected with a terminal body thereof, so that the plug assembly is connectable to lampshades of different sizes, and the light body connecting structure is adapted and mounted with a light body in any of the lampshades, which is versatile and reduces production cost.

To achieve the above object, the present disclosure provides the light body connecting structure including a wiring terminal and a wire. The wiring terminal is electrically connected with a light body.

The wiring terminal comprises a terminal body and a plug assembly. The terminal body is matched with any opening of a lampshade. The plug assembly is connected with a first end of the terminal body. One end of the wire passes through a second end of the terminal body and is electrically connected with the plug assembly.

Optionally, the plug assembly comprises a wiring plug and a connecting piece. The wiring plug is detachably connected with the connecting piece. The terminal body defines a mounting groove matched with the connecting piece. The connecting piece is movably connected with the mounting groove, so that the wiring plug is movable along the mounting groove through the connecting piece. The wire passes through the connecting piece to electrically connect with the wiring plug.

Optionally, the connecting piece is a circular cylindrical sleeve. First outer threads are disposed on the outer wall of the connecting piece. First inner threads matched with the first outer threads are disposed on the mounting groove. The connecting piece is screwed with the mounting groove.

Optionally, the wiring plug is a rotatable plug. Second outer threads are defined on an outer side of the terminal body. An annular limiting piece is disposed on an end surface of the second end of the terminal body.

Optionally, fasteners are disposed on an outer side of the wire. A length of a section of the wire between one of the fasteners close to the wiring plug and the wiring plug is matched with a length of the connecting piece. A diameter of the wire matches an inner diameter of the connecting piece. Both of a size of the wiring plug and a size of each of the fasteners are greater than the inner diameter of the connecting piece. Wire groove penetrating the connecting piece is defined on one side of the connecting piece. A width of the wire groove is matched with the diameter of the wire, so that the section of the wire between the one of the fasteners close to the wiring plug and the wiring plug is allowed to pass through the wire groove and clamp into a through hole of the connecting piece, the wiring plug abuts against a top portion of connecting piece, and the one of the fasteners close to the wiring plug abuts against a bottom portion of the connecting piece.

Optionally, the mounting groove penetrates the terminal body. The plug assembly further comprises a clamping piece having a size greater than a diameter of a through hole of the connecting piece. A size of the wiring plug is less than the diameter of the through hole of the connecting piece, so that the wiring plug is allowed to pass through the through hole of the connecting piece to detachably connect with the clamping piece. The clamping piece is detachably connected with a top portion of the connecting piece.

Optionally, the light body connecting structure further comprises a support piece. A channel for the wire to pass through is defined in an interior of the support piece. At least two wiring ports are defined on an outer side of the support piece. The at least two wiring ports are communicated with the channel. The second end of the terminal body is detachably connected with the support piece. The one end of the wire respectively passes through the support piece and the second end of the terminal body to electrically connect with the plug assembly.

Optionally, a mounting port matched with the support piece is defined on the second end of the terminal body. The terminal body is detachably connected with the support piece through the mounting port.

The mounting groove defined on the first end of the terminal body is communicated with the mounting port. The mounting groove is configured to connect with the plug assembly. When the support piece is connected with the mounting port, one of the at least two wiring ports, close to the terminal body, of the support piece is aligned with the mounting port, and a size of each of the at least two wiring ports is greater than a size of the mounting groove, so that the plug assembly is allowed to plug into the support piece from the one of the at least two wiring ports.

Optionally, two ends of the wire are alternatively connected with the wiring terminal. The wire is integrally formed with the wiring plug of the wiring terminal.

Based on the same inventive concept, the present disclosure further provides a light group. The light group comprises lampshades, light bodies respectively accommodated in the lampshades, and light body connecting structures mentioned above. The lampshades defines openings, and each of the lampshades defines at least one opening. The light body connecting structures are matched with the openings of the lampshades. The wiring terminal of each of the light body connecting structures is connected with a corresponding opening on a corresponding lampshade. Each wiring terminal is plugged into a corresponding light body of the corresponding lampshade, so that each of the light bodies are fixed in a corresponding lampshade and the wiring terminal of each of the light body connecting structures is electrically connected with the corresponding light body. Each wiring terminal connected with the corresponding lampshade is connected with an opposite wiring terminal disposed on an adjacent lampshade, so that the light bodies are connected in series and the lampshades are connected in series.

Optionally, each of the lampshades is detachably connected with the opposite wiring terminal of the adjacent lampshade through a corresponding support piece. Each wire between each of the lampshades and the adjacent lampshade is inserted into the corresponding support piece.

Optionally, each of the lampshades comprises a lampshade body; each lampshade body is integrally formed. An accommodating cavity is defined in each lampshade body. Each of the light bodies is accommodated in each lampshade body. A plurality of openings communicated with the accommodating cavity are defined on each lampshade body. Each wiring terminal is detachably connectable to each of the plurality of openings on each lampshade body.

Optionally, each of the light bodies comprises a light-emitting piece and power connecting plugs. The light-emitting piece thereof is accommodated in each lampshade body; the power connecting plugs thereof are matched with the wiring plug of each of the light body connecting structures. The power connecting plugs thereof comprise at least one wiring input terminal plug and at least one wiring output terminal plug. The at least one wiring input terminal plug thereof and the at least one wiring output terminal plug thereof are fixedly connected with the light-emitting piece thereof. A power supply input end of the light-emitting piece thereof is electrically connected with the at least one wiring input terminal plug thereof. A power supply output end of the light-emitting piece thereof is electrically connected with the at least one wiring output terminal plug.

Optionally, each light-emitting piece comprises a circuit board and lamp beads uniformly distributed on the circuit board.

Optionally, each light-emitting piece comprises a light strip and a support. Each light strip is wrapped on an outer side of a corresponding support.

Optionally, the light group further comprises a stake. A last support piece disposed on a tail end of the light group is detachably connected with the stake. The stake is insertable into ground, so the light group is insertable into the ground.

Optionally, the light group further comprises a base. A last lampshade of the lampshades disposed on a tail end of the light group or a last support piece disposed on the tail end of the light group is detachably connected with the base.

Based on the same inventive concept, the present disclosure further provides an assembling method of a light group. The assembling method comprises:

a step S1: mounting wiring terminals respectively on two ends of one of the wires;

a step S2: plugging a first wiring terminal disposed on a first end of a first wire of the wires into a first end of one of light bodies;

a step S3: inserting the one of the light bodies into one of lampshades from a first opening of openings of the one of the lampshades, and connecting the first wiring terminal of a first light body connecting structure of the light body connecting structures to the first opening of the one of the lampshades;

a step S4: adjusting a distance between a wiring plug of a second wiring terminal and a second end of the one of the light bodies through the second wiring terminal disposed on one end of a second wire of the wires, inserting the wiring plug of the second wiring terminal into a second opening of the openings of the one of the lampshades, aligning and abutting the wiring plug of the second wiring terminal against the second end of the one of the light bodies; connecting the second wiring terminal to the second opening of the openings of the one of the lampshades, and enabling the wiring plug of the second wiring terminal being completely plugged into the second end of the one of the light bodies; and a step S5: sequentially assembling other light bodies and other lampshades according to steps S1, S2, S3, and S4 to complete assembly of the light group.

Optionally, in the step S1, wiring plugs are respectively integrally formed with two ends of the one of the wires. A first wiring plug disposed on a first end of the one of the wires abuts against a top portion of a first connecting piece thereof after passing through a first terminal body thereof. Then, a bottom portion of the first connecting piece thereof is connected with a mounting groove of the first terminal body thereof. Similarly, a second wiring plug disposed on a second end of the one of the wires is mounted at a top portion of a second connecting piece thereof.

Optionally, the step S1 further comprises a step of mounting one of support pieces. The step of mounting the one of the support pieces comprises:

a step S1.1: respectively integrally forming the two ends of the one of the wires with two wiring plugs, and respectively mounting two terminal bodies on two ends of the one of the support pieces;

a step S1.2: passing a first terminal plug disposed at the first end of the one of the wires through a first terminal body and a second terminal body of the two terminal bodies thereof to enable the two wiring plugs respectively disposed on the two ends of the one of the wires being respectively exposed from the two terminal bodies;

a step S1.3: fixing the first wiring plug disposed on the first end of the one of the wires to a top portion of a first connecting piece of the first terminal body thereof, and connecting a bottom portion of the first connecting piece to a mounting groove of the first terminal body thereof; and a step S1.4: fixing the second wiring plug disposed on the second end of the one of the wires to a top portion of a second connecting piece of the second terminal body, inserting a portion of the one of the wires that is exposed outside into the one of the support pieces from a mounting groove of the second terminal body, and connecting a bottom portion of the second connecting piece to the mounting groove of the second terminal body thereof.

Compared with the prior art, in the light body connecting structure of the present disclosure, the plug assembly is connected with the terminal body, so that the plug assembly is connectable to the lampshades of different sizes, and the light body connecting structure is adapted and mounted with the light body in any of the lampshades, which is versatile and reduces production cost. When assembling the one of the light bodies in the one of the lampshades, the first light body connecting structure is plugged into the first end of the one of the light bodies, the one of the light bodies is inserted into the one of the lampshades, and then the first light body connecting structure is connected with the first opening of the one of the lampshades. Then, the plug assembly of the second light body connecting structure is adjusted to an appropriate length and inserted into the second opening of the one of the lampshades. The size of the plug assembly of the second light body connecting structure is less than the second opening of the one of the lampshades, so the plug assembly of the second light body connecting structure is movable and adjustable in the second opening of the one of the lampshades to facilitate alignment with a first power connecting plug of the one of the light bodies. When the second light body connecting structure is mounted in place with the second opening of the one of the lampshades, the plug assembly of the second light body connecting structure is also plugged into the second end of the one of the light bodies, which effectively realize rapid alignment and assembly of the one of the light bodies in the one of the lampshades through the light body connecting structures, thereby improving assembly efficiency. In particular, when a top lampshade disposed at a head end of the light group has only one opening, a central position of the light body corresponding to the top lampshade is adjusted through the plug assembly thereof that is connected, to improve uniformity of illumination of the light body in the top lampshade.

In the light body connecting structure of the present disclosure, the fasteners are disposed on the wire. The section of the wire between one of the fasteners close to the wiring plug and the wiring plug passes through the wire groove of the connecting piece to be clamped in the through hole of the clamping piece The wiring plug abuts against the top portion of connecting piece, and the one of the fasteners close to the wiring plug abuts against the bottom portion of the connecting piece. When the connecting piece extends or draws back with respect to the mounting groove, the wiring plug does not move with respect to the connecting piece, ensuring reliability of extension and retraction of the wiring plug and stability of the wiring plug when docking with the corresponding light body, and making assembly more convenient.

In the light body connecting structure of the present disclosure, the second outer threads are defined on the outer side of the terminal body. The annular limiting piece is disposed on the end surface of the second end of the terminal body. When the terminal body is screwed into any opening of the lampshade, the annular limiting piece effectively prevents the terminal body from being over-screwed. The light body connecting structure comprises the wiring plug that is the rotatable plug matched with any of the light bodies. When the wiring plug is aligned with a corresponding power connecting plug of a corresponding light-emitting piece, during a process of screwing the terminal body into any opening of the lampshade along second inner threads of the opening, connection between the light body connecting structure and the corresponding light-emitting piece is realized.

In the present disclosure, integrated production of wiring plugs and fasteners disposed on the two ends of each wire is ensured. The wiring plugs disposed on the two ends of each wire are assembled with corresponding two terminal bodies through corresponding connecting pieces. Each of the support pieces is disposed between each two corresponding terminal bodies, which serves as a rigid support between two adjacent lampshades. Different light groups may be assembled according to application scenarios. The interior of each of the support pieces is configured to store a portion of a corresponding wire to hide wiring. Moreover, the interior of each of the support pieces also accommodates a certain length of the corresponding wire, which is reserved for a moving stroke of corresponding wiring plugs, without affecting mounting of the connecting pieces disposed on the two ends of the corresponding wire, and the connecting pieces disposed on the two ends of the corresponding wire are allowed to drive corresponding two wiring plugs to extend or retract at the same time. After the corresponding two terminal bodies are connected with each of the support pieces, the corresponding two terminal bodies are respectively screwed into two openings of the two adjacent lampshades through each of the support pieces served as a handle, so that there is no need to provide a hand piece on each of the terminal bodies, which reduces the production cost and makes the terminal bodies more simple and beautiful. In particular, each of the support pieces is also configured as a sealing piece for the corresponding two terminal bodies, and each of the support pieces seals the mounting port of each of the corresponding two terminal bodies, thereby enhancing waterproof and dustproof capabilities of each of the lampshades.

In the present disclosure, the mounting groove and the mounting port respectively defined on two ends of each of the terminal bodies are communicated with each other. When each of the support pieces is connected with corresponding mounting ports, the at least two wiring port of each of the support pieces are aligned with corresponding mounting ports. The size of each of the at least two wiring ports is greater than a size of each of corresponding mounting grooves. The corresponding connecting pieces are inserted into each of the support pieces from the at least two wiring ports thereof. Therefore, each of the wiring plugs has larger moving stroke and is hidden in each of the support pieces to ensure a beautiful appearance of the light group.

Each of the lampshades of the present disclosure defines the plurality of openings, so that the adjacent lampshade is connected with it from multiple directions and dimensions, and the lampshades are able to be assembled into the light group according to the application scenarios. The last lampshade of the lampshades disposed on the tail end of the light group is connected with the stake or the base through the last support piece connected with the last lampshade, or, the last lampshade is directly connected with the base. When the last support piece is connected with the stake, one of the at least two wiring ports (e.g., a third wiring port) is defined on one side of the last support piece for a last wire to pass through to connected with an external power supply. Compared with a conventional light group, in the present disclosure, there is no need to set up an additional support frame as a skeleton to support the light group. The support pieces are straight cylindrical sleeves, arc cylindrical sleeves, and a combination thereof, etc., which are selected according to needs of a user. The supports pieces are replaceable to enable the light group having different assembling shapes, which brings a sense of freshness to the user. In addition, the light group is easy to disassemble and assemble, takes up little space during packaging, and is convenient to transport.

Figure 1:
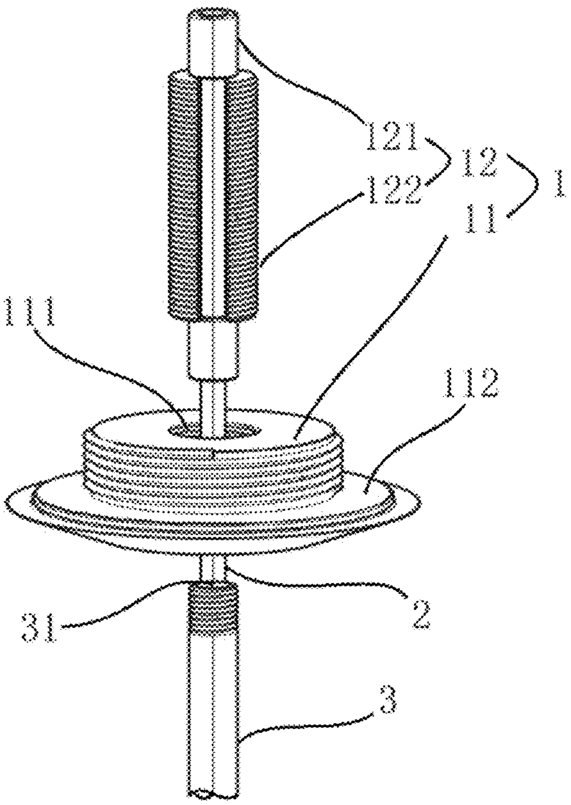
FIG. 1 is a schematic diagram of a light body connecting structure according to one embodiment of the present disclosure.

1—wiring terminal; 1*a*—wiring terminal not connected with a wire; 11—terminal body; 111—mounting groove; 112—annular limiting piece; 113—mounting port; 12—plug assembly; 121—wiring plug; 122—connecting piece; 1221—wire groove; 123—clamping piece; 2—wire; 21—fastener; 3—support piece; 3*a*—support piece with no wire accommodated therein; 31—wiring port; 4—lampshade body; 41—opening; 42—countersunk groove; 5—light-emitting piece; 51—circuit board; 52—lamp bead; 53—light strip; 54—support; 6—power connecting plug; 7—staket; 8—base.

DETAILED DESCRIPTION

In order to enable those skilled in the art to better understand the technical solutions in the present disclosure, technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

It should be noted that when one component is referred to as being "fixed on" or "disposed on" another component, it can be directly disposed on the other component or it may be indirectly fixed or disposed on the other component through a third component. When one component is said to be "connected with" another component, it may be directly connected with the other component or it may be indirectly connected with the other component through a third component.

It should be understood that in the description of the present disclosure terms such as "length", "width", "upper", "lower", "left", "right", "vertical", "horizontal", "top", "bottom", "inner", "outer", "inner", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified.

It is noted that structures, proportions, sizes, and the like shown in the drawings of the present specification are only used to cooperate with the contents disclosed in the description, so as to be understood and read by those skilled in the art, and are not intended to limit the limiting conditions that can be implemented by the present disclosure, so that the technical content disclosed in the present disclosure should still fall within the scope covered by the technical content disclosed in the present disclosure without affecting the effect and the purpose that can be achieved in the present disclosure.

EMBODIMENTS

In the prior art, lengths of two terminals inserted into a lampshade that is integrally formed are fixed. An overall length of the two terminals after the two terminals are plugged into a light body matches a distance between two openings of the lampshade. When producing the terminals, it is necessary to control a length of each of the terminals, so that the overall length of the two terminals after the two terminals are plugged into the light body is neither too long nor too short. Therefore, lampshades of different sizes need to be adapted to different lamp bodies or different terminals, and different production lines need to be added, which increase quality control cost and production line cost. Moreover, when plugs configured to dock with the terminals are disposed on the light body, and angles of the plugs are multi-dimensional and lengths of the plugs are different, different terminals need to be provided to match the plugs, which increases management cost of different terminals.

In order to solve problems in the prior art, the present disclosure provides a light body connecting structure. As shown in FIG. 1, the light body connecting structure comprises a wiring terminal 1 electrically connected with a light body and a wire 2. The wiring terminal 1 comprises a terminal body 11 and a plug assembly 12. The terminal body 11 is matched with any opening of a lampshade. The plug assembly 12 is screwed with a first end of the terminal body 11. One end of the wire 2 passes through a second end of the terminal body 11 and is electrically connected with the plug assembly 12.

Specifically, as shown in FIG. 1, the plug assembly 12 comprises a wiring plug 121 and a connecting piece 122. The wiring plug 121 is detachably connected with the connecting piece 122.

Specifically, as shown in FIG. 1, the terminal body 11 defines a mounting groove III matched with the connecting piece 122. The connecting piece 122 is movably connected with the mounting groove 111, so that the wiring plug 121 is movable along the mounting groove 111 through the connecting piece 122. The wire 2 passes through the connecting piece 122 to electrically connect with the wiring plug 121. The connecting piece 122 is movably connected with the installation groove 111, that is, the connecting piece 122 is extended or retracted in the mounting groove 111. After extending or retracting to a specified position, the connecting piece 122 is fixed in the mounting groove 111.

Figure 2:
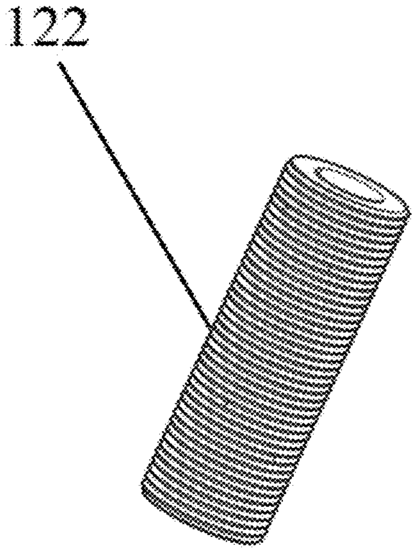
FIG. 2 is a schematic diagram of a first embodiment of a connecting piece according to one embodiment of the present disclosure.

Specifically, as shown in FIG. 2, the connecting piece is a circular cylindrical sleeve. First outer threads are disposed on the outer wall of the connecting piece 122. First inner threads matched with the first outer threads are disposed on the mounting groove 111. The connecting piece122 is screwed with the mounting groove 111.

Specifically, the wiring plug 121 is a rotatable plug. Second outer threads matched with any opening 41 of the lampshade are defined on an outer side of the terminal body 11. An annular limiting piece 112 is disposed on an end surface of the second end of the terminal body 11. The rotatable plug may comprise a male plug or a female plug matched with the light body 31. The rotatable plug may be a headphone plug, a direct current (DC) plug, an audio plug, and other plug having a cylindrical connector to support, fix, and electrically connect with the light body 31. During a plugging process, the male plug or the female plug of the rotatable plug is rotated arbitrarily while maintaining electrical connection between the female plug and the male plug.

Figure 3:
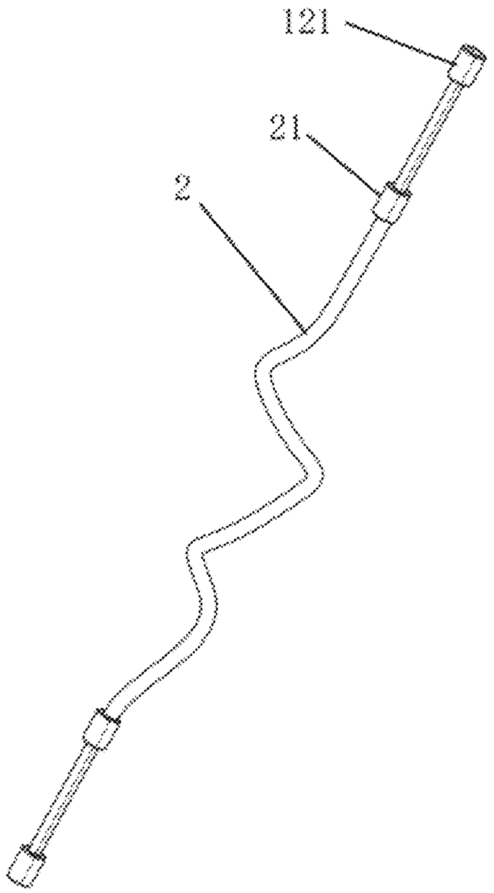
FIG. 3 is a schematic diagram of a wire, fasteners, and wiring plugs that are integrally forming formed according to one embodiment of the present disclosure.
Figure 4:
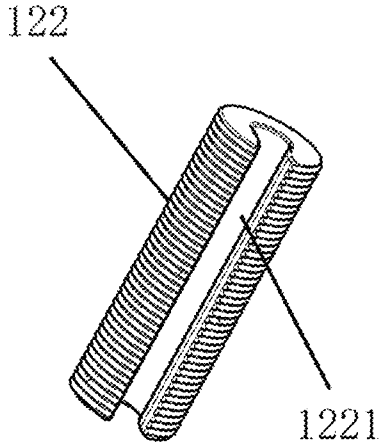
FIG. 4 is a schematic diagram of a second embodiment of a connecting piece according to one embodiment of the present disclosure.

In some embodiments, the wiring plug 121 is detachably connected with the connecting piece 122. For instance, as shown in FIGS. 1, 3, and 4, fasteners 21 are disposed on an outer side of the wire 2. A length of a section of the wire 2 between one of the fasteners 21 close to the wiring plug 121 and the wiring plug 121 is matched with a length of the connecting piece 122. A diameter of the wire 2 matches an inner diameter of the connecting piece 122. Both of a size of the wiring plug 121 and a size of each of the fasteners 21 are greater than the inner diameter of the connecting piece 122. The mounting groove penetrates the terminal body 11. Wire groove 1221 penetrating the connecting piece 122 is defined on one side of the connecting piece 122. A width of the wire groove 1221 is matched with the diameter of the wire 2, so that the section of the wire 2 between the one of the fasteners 21 close to the wiring plug 121 and the wiring plug 121 is allowed to pass through the wire groove 1221 and clamp into a through hole of the connecting piece 122, the wiring plug 121 abuts against a top portion of connecting piece 122, and the one of the fasteners 21 close to the wiring plug 121 abuts against a bottom portion of the connecting piece 122. It should be noted that the wire groove 1221 is a V-shaped opening, which allows a user to mount the wiring plug 121 on the connecting piece 122, so that the section of the wire 2 between the one of the fasteners 21 close to the wiring plug 121 and the wiring plug 121 is quickly clamped into the connecting piece 122. It should be noted that in some embodiments, the mounting groove 111 penetrates the terminal body 11.

Figure 5:
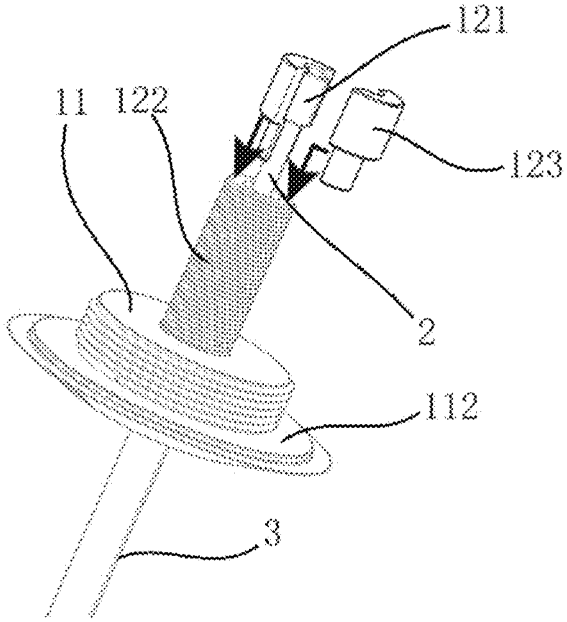
FIG. 5 is a schematic diagram showing an assembly of a clamping piece on a wire plug according to one embodiment of the present disclosure.

In some alternative embodiments, the wiring plug 121 is detachably connected with the connecting piece 122. For instance, as shown in FIG. 5, the plug assembly 12 further comprises a clamping piece 123 having a size greater than a diameter of a through hole of the connecting piece 122. A size of the wiring plug 121 is less than the diameter of the through hole of the connecting piece 122, so that the wiring plug 121 is allowed to pass through the through hole of the connecting piece 122 to detachably connect with the clamping piece 123. The clamping piece is detachably connected with a top portion of the connecting piece 122.

It needs to be noted that the size of the wiring plug 121 is greater than the size of the wire 2, the clamping piece 123 comprises a left semi-symmetrical piece and a right semi-symmetrical piece that are connected into a circular sleeve. The circular sleeve internally defines a cavity for accommodating the wiring plug 121. A bottom portion of the cavity defines a first cavity port for the wire 2 to pass through. A top portion of the cavity defines a second cavity port for aligning and connected with the light body. A size of the first cavity port matches the size of the wire 2. An outer diameter of the circular sleeve matches the inner diameter of the connecting piece122, and a protrusion is disposed on an outer side of the top portion of the circular sleeve. Therefore, after the wiring plug 121 connected with the wire 2 passes through the top portion of the connecting piece 122, the circular sleeve is open, and the left semi-symmetrical piece and the right semi-symmetrical piece respectively clamp the wiring plug 121. Then the left semi-symmetrical piece and the right semi-symmetrical piece are connected to form the circular sleeve. The bottom portion of the circular sleeve is inserted into a top portion of the through hole of the connecting piece 122, and the protrusion simultaneously clamps a top surface of the connecting piece 122, so that the wiring plug 121 is fixed to the top portion of the connecting piece 122. The bottom portion of the circular sleeve is in interference fit with the through hole of the connecting piece 122, so that a position of the connecting piece 122 with respect to the wiring plug 121 is fixed when extending and retracting.

Figure 6:
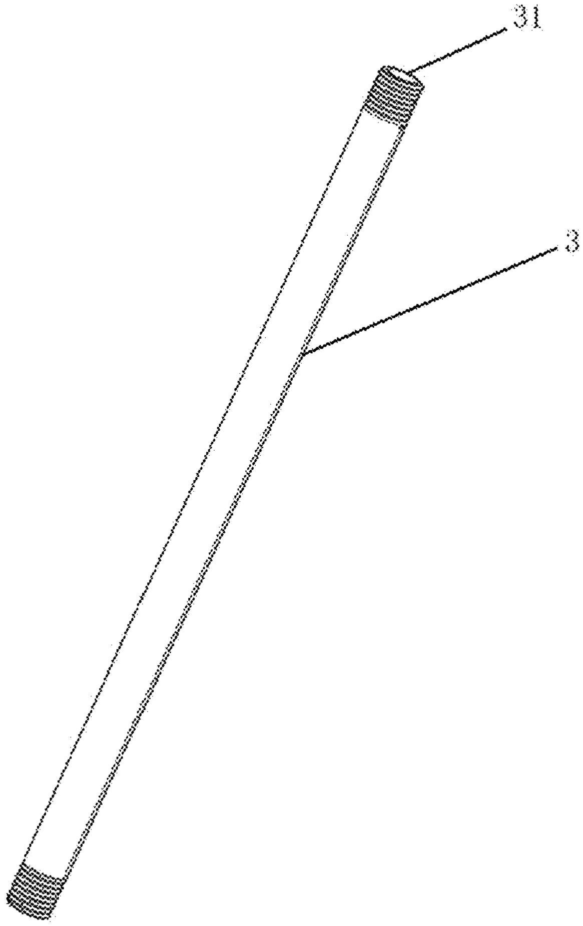
FIG. 6 is a schematic diagram of a support piece according to one embodiment of the present disclosure.

Specifically, as shown in FIG. 6, the light body connecting structure further comprises a support piece 3. A channel for the wire to pass through is defined in an interior of the support piece 3. At least two wiring ports 31 are defined on an outer side of the support piece 3. The at least two wiring ports 31 are communicated with the channel. The second end of the terminal body 11 is detachably connected with the support piece 3. The one end of the wire 2 respectively passes through the support piece 3 and the second end of the terminal body 11 to electrically connect with the plug assembly 12.

Figure 7:
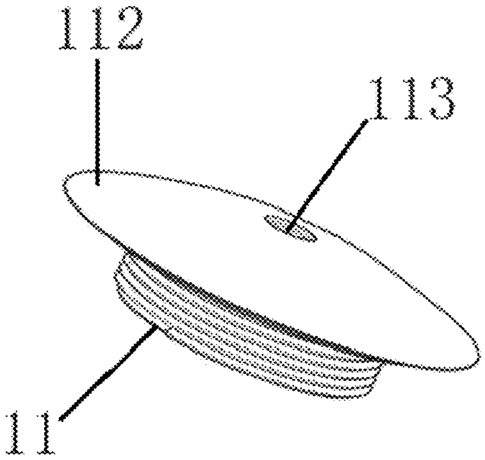
FIG. 7 is a schematic diagram of a terminal body defining a mounting port according to one embodiment of the present disclosure.

Specifically, as shown in FIG. 7, a mounting port 113 matched with the support piece 3 is defined on the second end of the terminal body 11. The terminal body 11 is detachably connected with the support piece 3 through the mounting port 113. The mounting groove 111 defined on the first end of the terminal body 11 is communicated with the mounting port 113. The mounting groove 111 is configured to connect with the plug assembly 112. When the support piece 3 is connected with the mounting port 113, one of the at least two wiring ports 31, close to the terminal body 11, of the support piece 3 is aligned with the mounting port 111, and a size of each of the at least two wiring ports is greater than a size of the mounting groove, so that the plug assembly 12 is allowed to plug into the support piece 3 from the one of the at least two wiring ports 31. The support piece 3 may be a straight cylindrical sleeve, an arc cylindrical sleeve, a bolted cylindrical sleeve, etc., and is configured according to different application scenarios. Third outer threads are defined on two ends of the support piece 3 and third inner threads are defined on the mounting port 113, and the support piece 3 is screwed with the mounting port 113.

Specifically, as shown in FIG. 3, two ends of the wire 2 are alternatively connected with the wiring terminal 1. The wire 2 is integrally formed with the wiring plug 121 of the wiring terminal 1.

The present disclosure further provides a light group. The light group comprises lampshades, light bodies respectively accommodated in the lampshades, and light body connecting structures mentioned above. The lampshades defines openings, and each of the lampshades defines at least one opening. The light body connecting structures are matched with the openings 41 of the lampshades. The wiring terminal 1 of each of the light body connecting structures is connected with a corresponding opening 41 on a corresponding lampshade. Each wiring terminal 1 is plugged into a corresponding light body of the corresponding lampshade, so that each of the light bodies are fixed in a corresponding lampshade and the wiring terminal 1 of each of the light body connecting structures is electrically connected with the corresponding light body. Each wiring terminal 1 connected with the corresponding lampshade is connected with an opposite wiring terminal 1 disposed on an adjacent lampshade, so that the light bodies are connected in series and the lampshades are connected in series. A last lampshade disposed on a tail end of the light group, a non-connected light connecting structure and one of the wire connected with the last lampshade are configured to connected with an external power supply.

Figure 8:
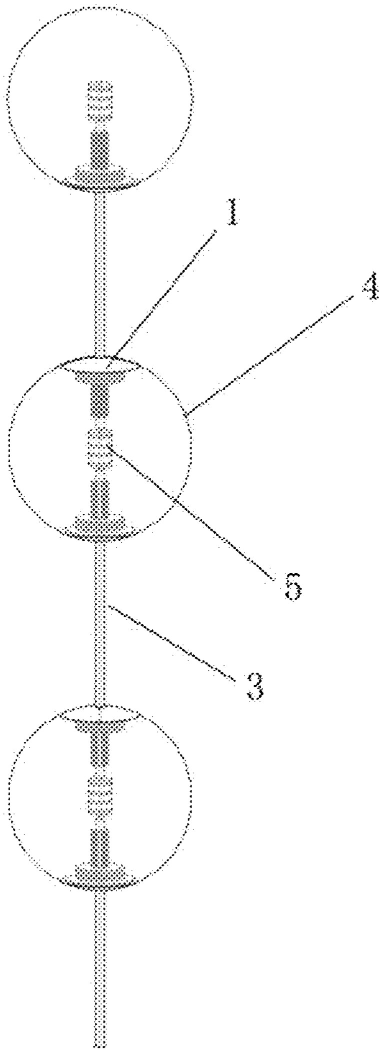
FIG. 8 is a schematic diagram of a light group linearly expanded in one dimension according to one embodiment of the present disclosure.

Specifically, as shown in FIG. 8, each of the lampshades is detachably connected with the opposite wiring terminal 1 of the adjacent lampshade through a corresponding support piece 3. Each wire between each of the lampshades and the adjacent lampshade is inserted into the corresponding support piece 3.

Figure 9:
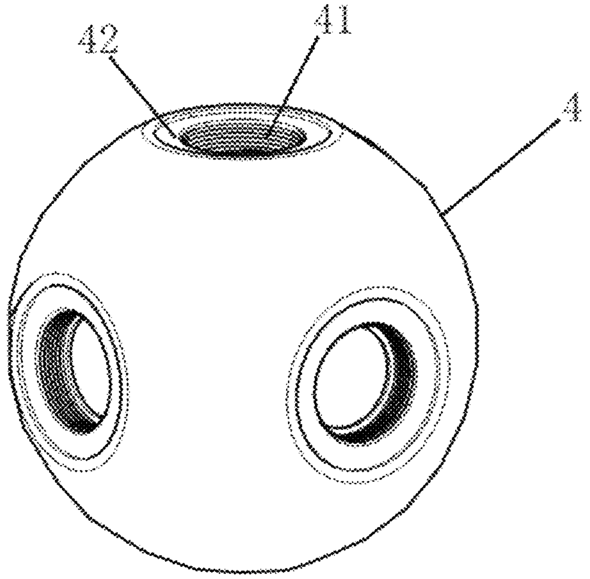
FIG. 9 is a schematic diagram of a lampshade defining three openings according to one embodiment of the present disclosure.

As shown in FIG. 9, each of the lampshades comprises a lampshade body 4. Each lampshade body 4 is integrally formed. An accommodating cavity is defined in each lampshade body. Each of the light bodies is accommodated in each lampshade body. A plurality of openings 41 communicated with the accommodating cavity are defined on each lampshade body 4. Each wiring terminal 1 is detachably connectable to each of the plurality of openings 41 on each lampshade body 4. Specifically, second inner threads are defined on each of the plurality of openings 41 on each lampshade body 4, and the second inner threads on each of the plurality of openings 41are matched with the second outer threads of each terminal body 11.

Specifically, each of the light bodies comprises a light-emitting piece 5 accommodated in each lampshade body 4 and power connecting plugs 6. The power connecting plugs 6 thereof are matched with the wiring plug 121 of each of the light body connecting structures. The power connecting plugs 6 thereof comprise at least one wiring input terminal plug and at least one wiring output terminal plug. The at least one wiring input terminal plug thereof and the at least one wiring output terminal plug thereof are fixedly connected with the light-emitting piece 5 thereof. A Power supply input end of the light-emitting piece 5 thereof is electrically connected with the at least one wiring input terminal plug thereof. A power supply output end of the light-emitting piece 5 thereof is electrically connected with the at least one wiring output terminal plug.

Figure 10:
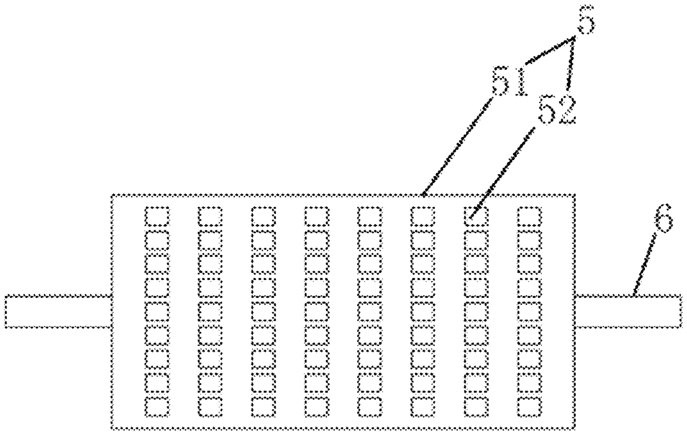
FIG. 10 is a schematic diagram of a first embodiment of a light-emitting piece according to one embodiment of the present disclosure.

Specifically, as shown in FIG. 10, each light-emitting piece 5 comprises a circuit board 51 and lamp beads 52 uniformly distributed on the circuit board 51. The lamp beads 52 are respectively electrically connected with the circuit board 51.

Figure 12:
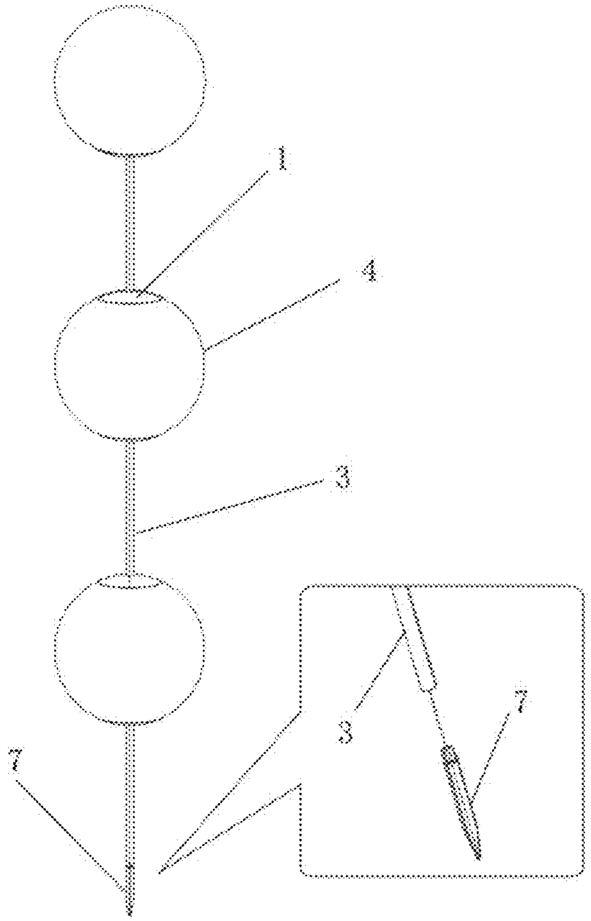
FIG. 12 is a schematic diagram of the light group having a stake according to one embodiment of the present disclosure.

Specifically, as shown in FIG. 12, each light-emitting piece 5 comprises a light strip 53 and a support 54. Each light strip 53 is wrapped on an outer side of a corresponding support 54. Each support 54 is a cylindrical transparent support.

It should be noted that each light strip 53 comprises small bulbs or LED lamps that are uniformly distributed, and has a soft and flexible external material, such as a rubber sleeve or a plastic sleeve. Each light strip 53 comprises a self-adhesive backing adhesive, which allows each light strip 53 being conveniently adhered to the corresponding support 54.

Specifically, as shown in FIG. 12, the light group further comprises a stake 7. A last support piece 3 disposed on a tail end of the light group is detachably connected with the stake 7. The stake is insertable into ground, so the light group is insertable into the ground for supporting on the ground. One of the at least two wiring ports 31 is defined on one side of the last support piece 3, a last wire 2 thereof is allowed to pass through the one of the at least two wiring ports 31 of the last support piece to connect with the external power supply.

Figure 13:
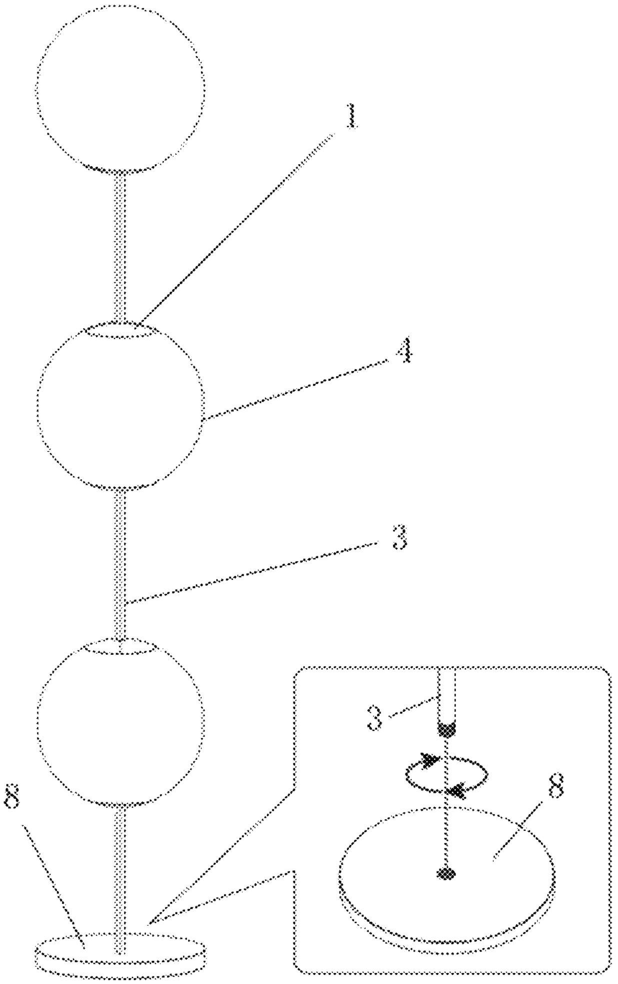
FIG. 13 is a schematic diagram of the light group having a base according to one embodiment of the present disclosure.

Specifically, as shown in FIG. 13, the light group further comprises a base 8. A last lampshade of the lampshades disposed on a tail end of the light group or a last support piece 3 disposed on the tail end of the light group is detachably connected with the base 8, so that the light group is supported on the ground or connected with a ceiling through the base 8.

Figure 14:
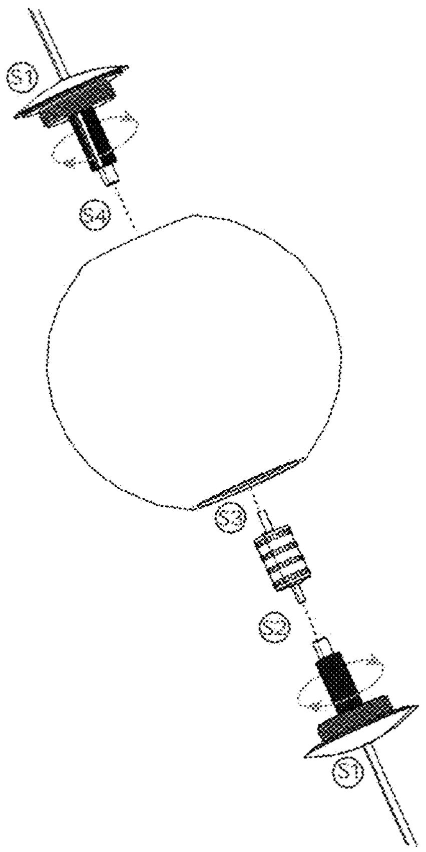
FIG. 14 is a schematic diagram of steps S1-S4 of an assembling method of the light group according to one embodiment of the present disclosure.

As shown in FIG. 14, the present disclosure further provides an assembling method of a light group. The assembling method comprises:

- a step S1: mounting wiring terminals respectively on two ends of one of the wires;
- a step S2: plugging a first wiring terminal disposed on a first end of a first wire of the wires into a first end of one of light bodies;
- a step S3: inserting the one of the light bodies into one of lampshades from a first opening of openings of the one of the lampshades, and connecting the first wiring terminal of a first light body connecting structure of the light body connecting structures to the first opening of the one of the lampshades;
- a step S4: adjusting a distance between a wiring plug of a second wiring terminal and a second end of the one of the light bodies through the second wiring terminal disposed on one end of a second wire of the wires, inserting the wiring plug of the second wiring terminal into a second opening of the openings of the one of the lampshades, aligning and abutting the wiring plug of the second wiring terminal against the second end of the one of the light bodies; connecting the second wiring terminal to the second opening of the openings of the one of the lampshades, and enabling the wiring plug of the second wiring terminal being completely plugged into the second end of the one of the light bodies; and
- a step S5: sequentially assembling other light bodies and other lampshades according to steps S1, S2, S3, and S4 to complete assembly of the light group.

The assembling method is used to assemble light group having different shapes, including a light group in a shape of tree branches. Each terminal body 1 comprises a handle piece (not shown in the drawings) on the end surface close to the annular limiting piece 112 thereof. By holding each handle piece to rotate each terminal body, each terminal body is effectively screwed into a corresponding opening of a corresponding lampshade, thereby preventing each terminal body from being difficult to rotate.

Specifically, in the step S1, wiring plugs 121 are respectively integrally formed with two ends of the one of the wires. A first wiring plug 121 disposed on a first end of the one of the wires 2 is fixed to a top portion of a first connecting piece 121 thereof after passing through a first terminal body 11 thereof. Then, a bottom portion of the first connecting piece 122 thereof is connected with a mounting groove 11 of the first terminal body 11 thereof. Similarly, a second wiring plug 121 disposed on a second end of the one of the wires 2 is mounted at a top portion of a second connecting piece 122 thereof.

Figure 15:
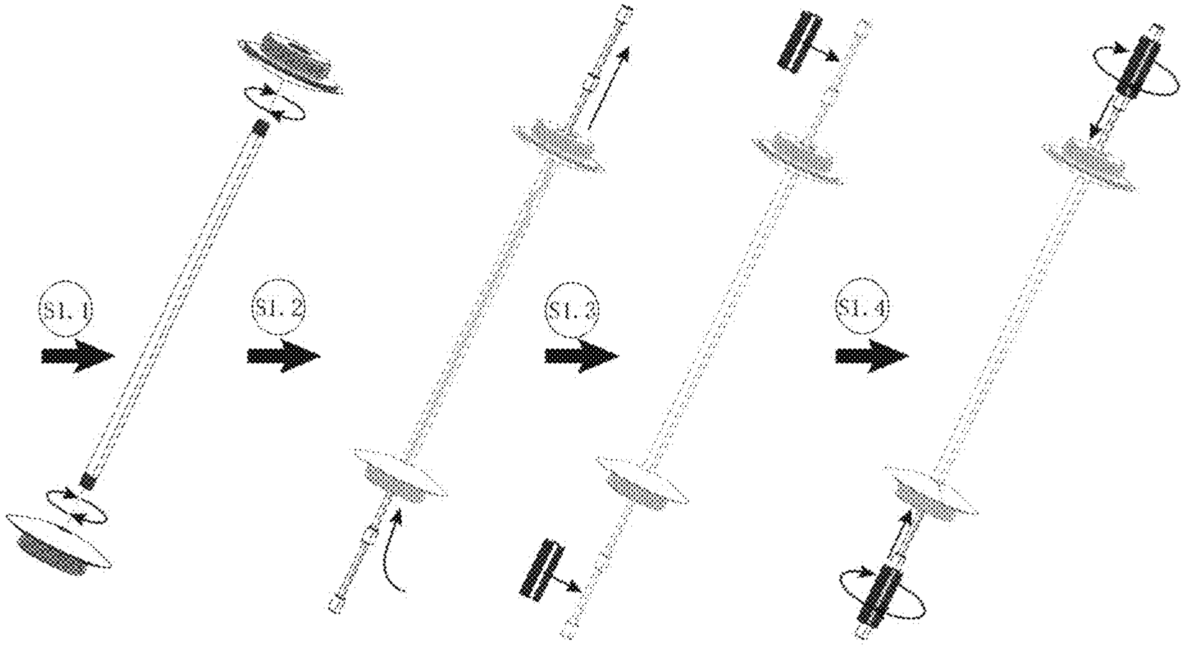
FIG. 15 is a schematic diagram of a first embodiment of steps S1.1-S1.4 of the assembling method of the light group according to one embodiment of the present disclosure.
Figure 16:
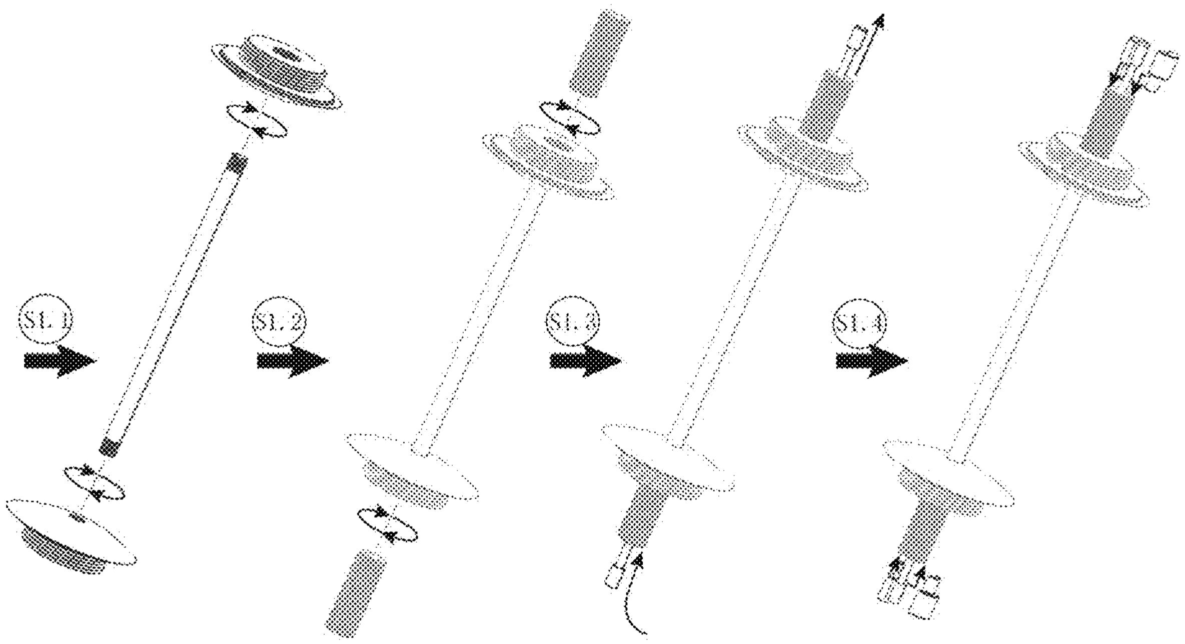
FIG. 16 is a schematic diagram of a second embodiment of steps S1.1-S1.4 of the assembling method of the light group according to one embodiment of the present disclosure.

Specifically, as shown in FIGS. 15 and 16, the step S1 further comprises a step of mounting one of support pieces 3. The step of mounting the one of the support pieces 3 comprises:

- a step S1.1: respectively integrally forming the two ends of the one of the wires 2 with two wiring plugs 121, and respectively mounting two terminal bodies 11 on two ends of the one of the support pieces 3;
- a step S1.2: passing a first terminal plug 121 disposed at the first end of the one of the wires 2 through a first terminal body 11 and a second terminal body 11of the two terminal bodies thereof to enable the two wiring plugs 121 respectively disposed on the two ends of the one of the wires 2 being respectively exposed from the two terminal bodies 11;
- a step S13: fixing the first wiring plug 121 disposed on the first end of the one of the wires 2 to a top portion of a first connecting piece 122 of the first terminal body 11 thereof, and connecting a bottom portion of the first connecting piece 122 to a mounting groove 111 of the first terminal body 11 thereof; and
- a step S1.4: fixing the second wiring plug 121 disposed on the second end of the one of the wires 2 to a top portion of a second connecting piece 122 of the second terminal body 11, inserting a portion of the one of the wires 2 that is exposed outside into the one of the support pieces 3 from a mounting groove 111 of the second terminal body, and connecting a bottom portion of the second connecting piece to the mounting groove 111 of the second terminal body 11 thereof.

Figure 11:
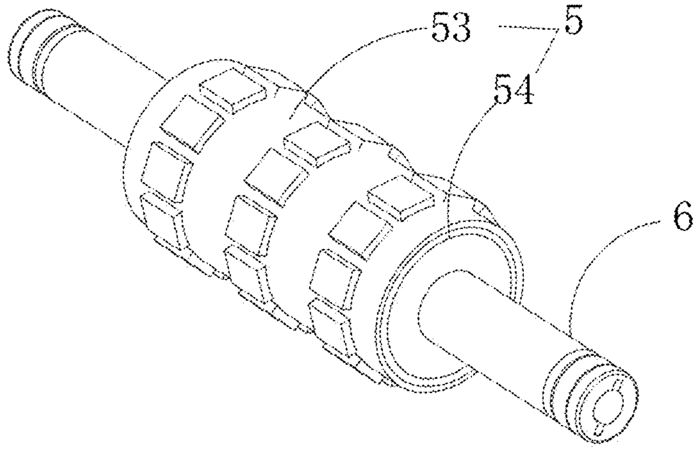
FIG. 11 is a schematic diagram of a second embodiment of the light-emitting piece according to one embodiment of the present disclosure.

As shown in FIGS. 11, 12, and 13, the assembling method is used to assemble a light group that is linearly expanded in one dimension. Each of the support pieces 3 is the straight cylindrical sleeve or the are cylindrical sleeve. Each of the lampshades in a middle portion of the light group defines two openings that are symmetrically disposed. A top lampshade disposed at a topmost of the light group defines only one opening, and the last lampshade disposed at a bottommost of the light group is connected with the base 8 through the last support piece 3 connected with the last lampshade. The last support piece 3 is screwed with the base 8, and the last wire is allowed to pass through the base 8 for connecting to the external power supply. Alternatively, the last support piece 3 is directly connected with the stake 7, and one of the at least two wiring ports 31 (e.g., a third wiring port) is defined on the one side of the last support piece 3 for the last wire to pass through. Shapes of the lampshades may be one or combinations of spherical, elliptical, and polygonal. It should be noted that the lampshades that matches the terminal bodies 1 define countersunk grooves that match with annular limiting pieces 112 thereof, so that each of the annular limiting pieces112 is inserted into a corresponding countersunk groove 42, and a surface of each of the annular limiting pieces 112 is flush with a surface of a corresponding lampshade to maintain an aesthetic appearance of the light group. Moreover, an end surface located on an outer side of each of the wiring terminals 1 is configured to be a flat surface or an arc surface that matches the corresponding opening, so that after each of the wiring terminals 1 is connected with the corresponding opening of the corresponding lampshade, each of the wiring terminals 1 is engaged with the corresponding opening of the corresponding lampshade and maintain a complete shape of the corresponding lampshade.

Figure 17:
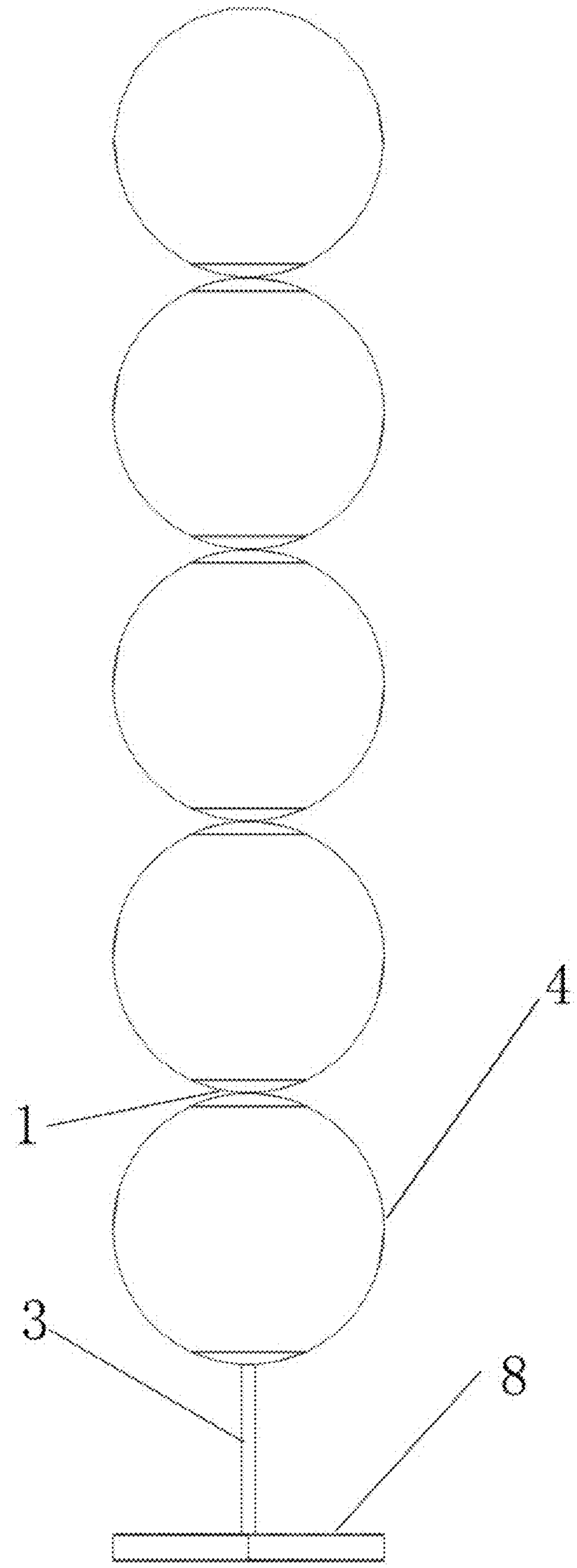
FIG. 17 is a schematic diagram of the light group according to one embodiment of the present disclosure where each two wiring terminals of each two adjacent lampshades are opposite to each other.

As shown in FIG. 17, it should be noted that each two wiring terminals 1 of each two adjacent lampshades are opposite to each other, so that a light group that is linearly expanded in one dimension and has no gap between each two adjacent lampshades is assembled.

Figure 18:
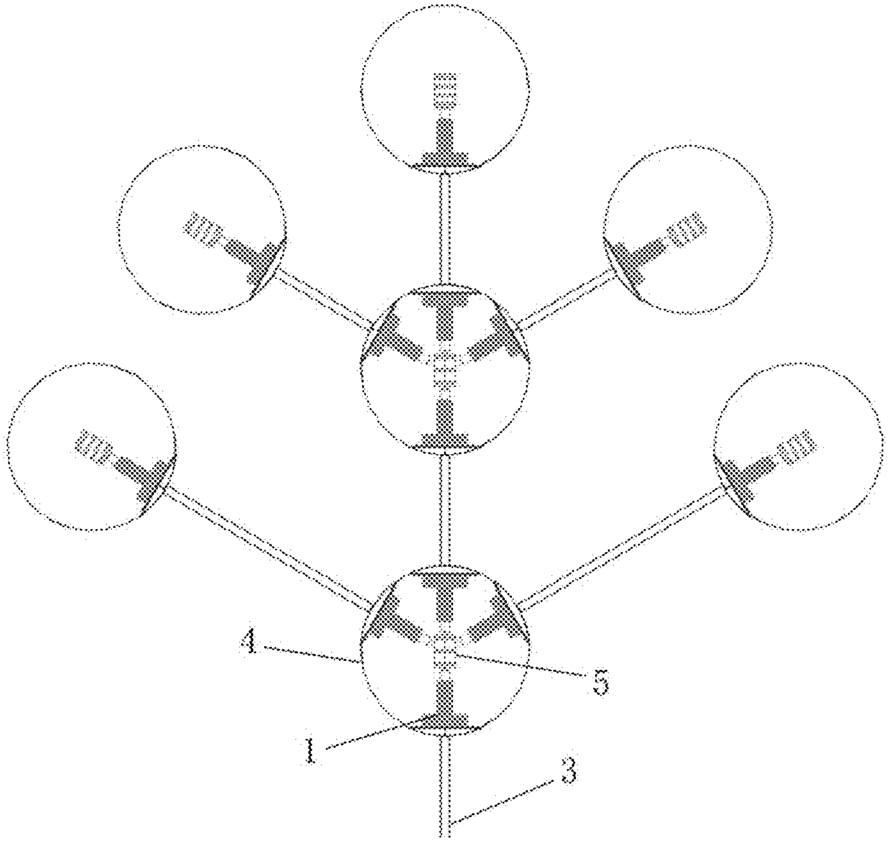
FIG. 18 is a schematic diagram of a first embodiment of the light group expanded in two dimensions according to one embodiment of the present disclosure.
Figure 19:
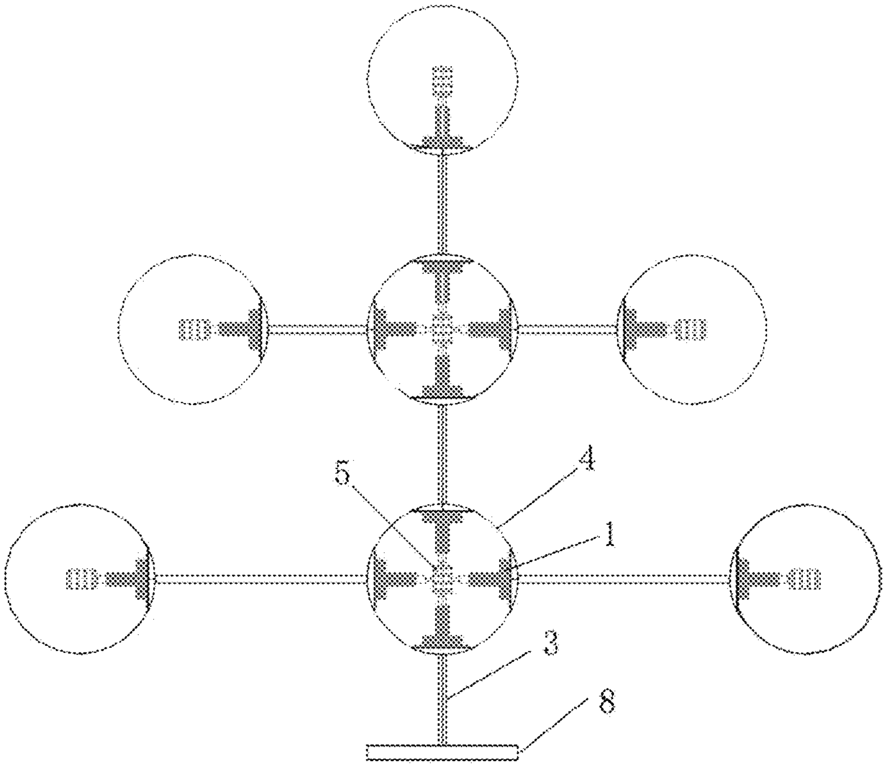
FIG. 19 is a schematic diagram of a second embodiment of the light group expanded in two dimensions according to one embodiment of the present disclosure.
Figure 20:
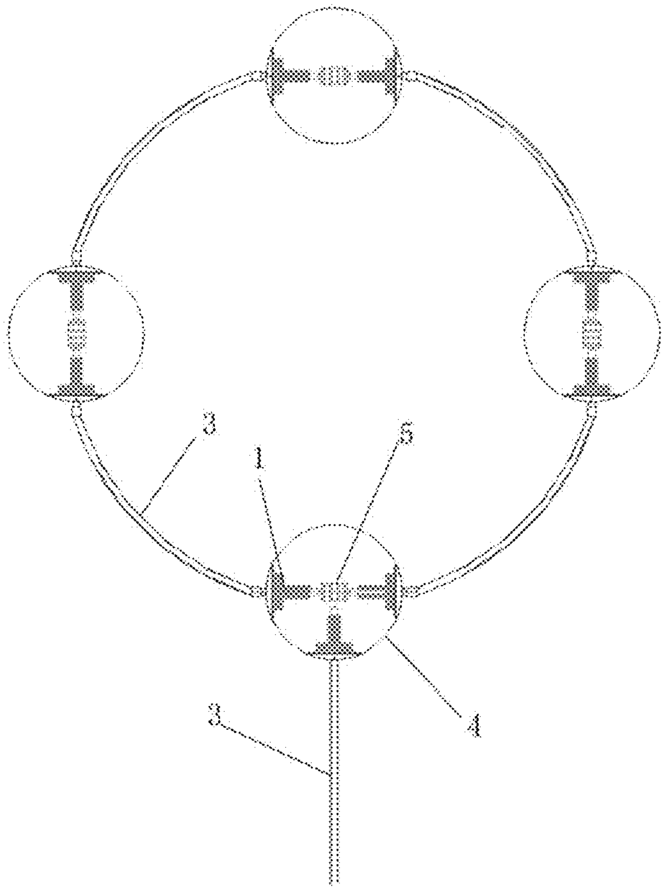
FIG. 20 is a schematic diagram of the light group in a ring shape according to one embodiment of the present disclosure.

As shown in FIGS. 18-19, the assembling method is also configured to assemble a light group expanded in two dimensions. Each of the support pieces 3 is in the shape of the straight cylindrical sleeve, and each of the lampshades in a middle portion thereof defines three openings located on a same plane and each light-emitting pieces 5 thereof comprises four power connecting plugs 6 and the light group thereof is assembled similarly. The last lampshade or the last support piece 3 located at the tail end thereof are alternatively assembled with the base 8 or the stake 7. It should be noted that an overall size of each light-emitting pieces is less than each of the openings of the lampshades, so the power connecting plugs 6 disposed on two sides of each light-emitting piece 5 are relatively shorter than the power connecting plugs 6 disposed on two ends of each light-emitting piece 5, so the wiring plugs 121 corresponding to the power connecting plugs 6 disposed on the two sides of the each light-emitting piece 5 need to be extended to ensure that all of the wiring plugs 121 are plugged into the power connecting plugs 6 of each light-emitting piece 5. As shown in FIG. 20, each of the support pieces 3 is in the shape of the arc cylindrical sleeve and the assembling method is configured to assemble a light group in a ring shaped. The last lampshade thereof is connected with the stake 7 or the base 8 through the last support piece thereof.

Figure 21:
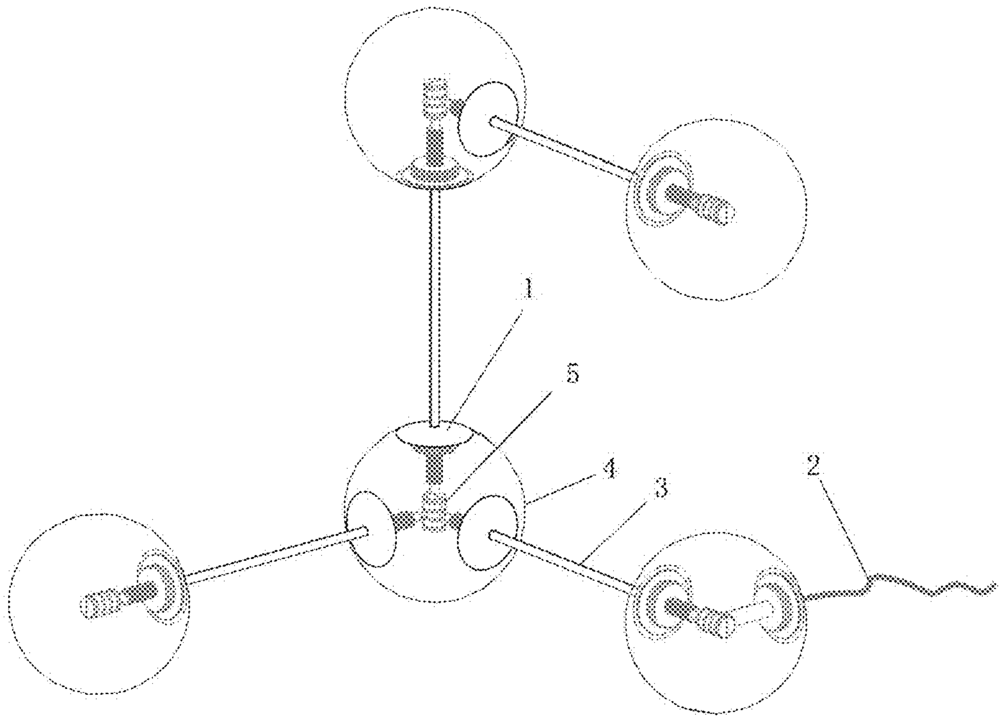
FIG. 21 is a schematic diagram of a first embodiment of the light group expanded in three dimensions according to one embodiment of the present disclosure.

As shown in FIG. 21, the assembling method is also configured to assemble a light group expanded in three dimensions. One of the lampshades in a middle portion thereof defines three openings in three dimensions of a space. For instance, coordinate axes X, Y, and Z are provided. The light-emitting piece 5 thereof defines three power plugs 6 corresponding to the one of the lampshade in the middle portion thereof. The light group is assemble similarly. The last lampshade or the last support piece 3 located at the tail end thereof is assembled with the base 8 or the stake 7.

Figure 22:
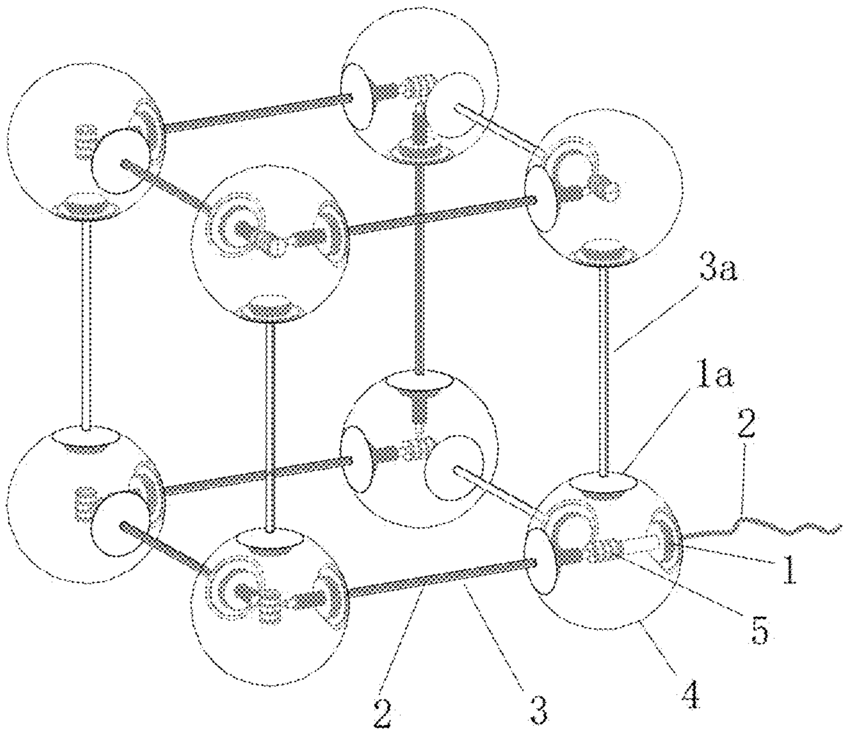
FIG. 22 is a schematic diagram of a second embodiment of the light group expanded in three dimensions according to one embodiment of the present disclosure.

As shown in FIG. 22, the assembling method is also configured to assemble a light group in a cube shape. The support pieces 3 for wiring of the wires 2 are first assembled with the lampshades according to the assembling method to complete series connection of a circuit of the light group. Then, the wiring terminal 1*a* not connected with any wire and the support piece 3*a* with no wire accommodated therein are finally assembled to complete the light group having a stable structure and a beautiful appearance.

Figure 23:
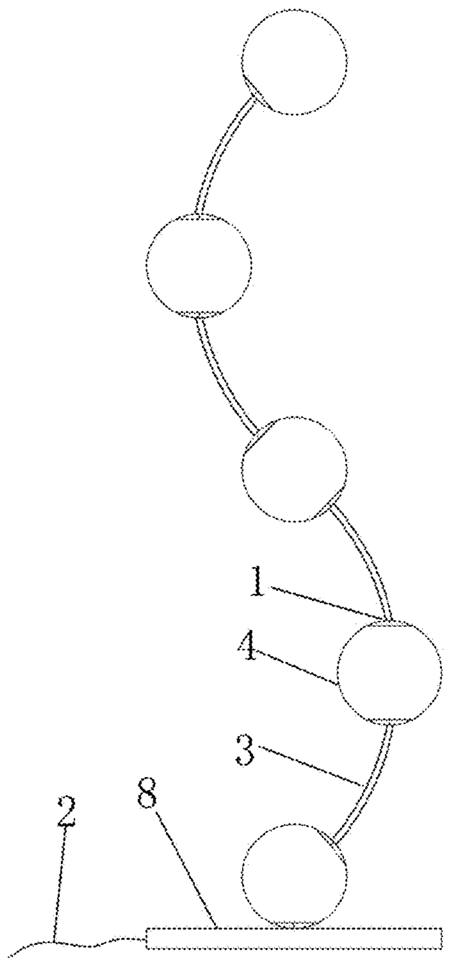
FIG. 23 is a schematic diagram of the light group in an S shape according to one embodiment of the present disclosure.
Figure 24:
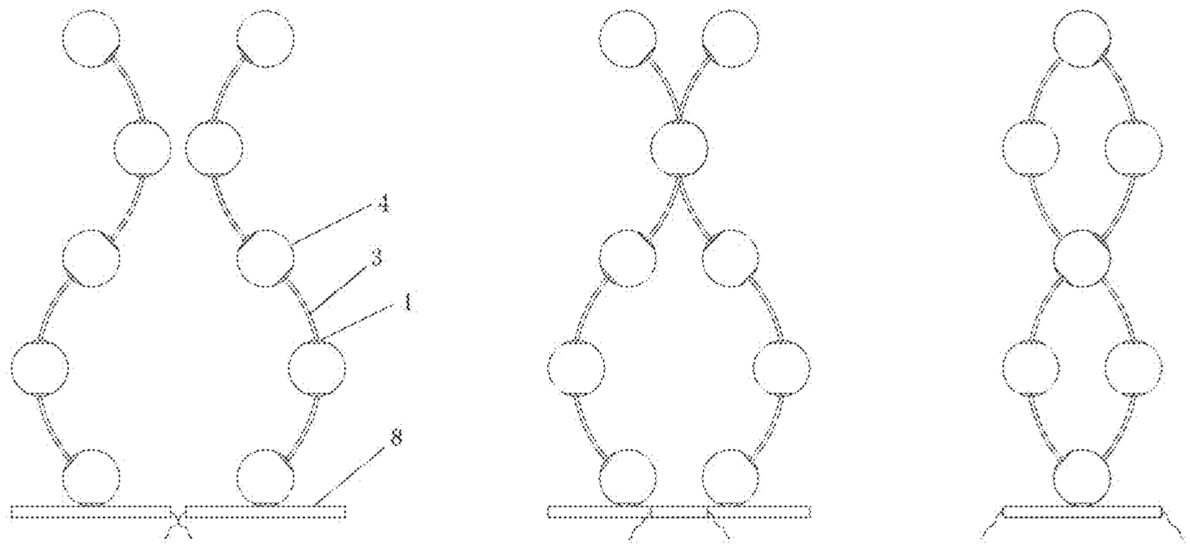
FIG. 24 is a schematic diagram of light kits assembled by a plurality of light groups in the S shape according to one embodiment of the present disclosure.

As shown in FIGS. 23 and 24, each of the support piece 3 is in a shape of the arc cylindrical sleeve, and a light group thereof is assembled into an S-shaped series-connected light group. A plurality of light groups are assembled to form a variety of aesthetic shapes. The light group is capable of being assembled into a spiral cylinder and a plurality of light groups are assembled into a spiral ascending series-connected light kit.

The above description of the disclosed embodiments enables those skilled in the art to implement or use the present disclosure. A variety of modifications to these embodiments are apparent to those skilled in the art, and general principles defined in the specification can be implemented in other embodiments without departing from the spirit or scope of the present disclosure. Thus, the present disclosure should not be limited to the embodiments disclosed herein, and should be subject to the widest scope consistent with the principles and novel features disclosed herein.

What is claimed is:

1. A light body connecting structure, comprising:

a wiring terminal electrically connected with a light body, and a wire;

wherein the wiring terminal comprises a terminal body and a plug assembly; the terminal body is matched with any opening of a lampshade; the plug assembly is connected with a first end of the terminal body; one end of the wire passes through a second end of the terminal body and is electrically connected with the plug assembly.

2. The light body connecting structure according to claim 1, wherein the plug assembly comprises a wiring plug and a connecting piece; the wiring plug is detachably connected with the connecting piece; the terminal body defines a mounting groove matched with the connecting piece; the connecting piece is movably connected with the mounting groove, so that the wiring plug is movable along the mounting groove through the connecting piece; the wire passes through the connecting piece to electrically connect with the wiring plug.

3. The light body connecting structure according to claim 2, wherein the connecting piece is a circular cylindrical sleeve; first outer threads are disposed on the outer wall of the connecting piece; first inner threads matched with the first outer threads are disposed on the mounting groove; the connecting piece is screwed with the mounting groove.

4. The light body connecting structure according to claim 2, wherein the wiring plug is a rotatable plug; second outer threads are defined on an outer side of the terminal body; an annular limiting piece is disposed on an end surface of the second end of the terminal body.

5. The light body connecting structure according to claim 3, wherein fasteners are disposed on an outer side of the wire; a length of a section of the wire between one of the fasteners close to the wiring plug and the wiring plug is matched with a length of the connecting piece; a diameter of the wire matches an inner diameter of the connecting piece; both of a size of the wiring plug and a size of each of the fasteners are greater than the inner diameter of the connecting piece; wire groove penetrating the connecting piece is defined on one side of the connecting piece; a width of the wire groove is matched with the diameter of the wire, so that the section of the wire between the one of the fasteners close to the wiring plug and the wiring plug is allowed to pass through the wire groove and clamp into a through hole of the connecting piece; the wiring plug abuts against a top portion of connecting piece, and the one of the fasteners close to the wiring plug abuts against a bottom portion of the connecting piece.

6. The light body connecting structure according to claim 3, wherein the plug assembly further comprises a clamping piece having a size greater than a diameter of a through hole of the connecting piece; a size of the wiring plug is less than the diameter of the through hole of the connecting piece, so that the wiring plug is allowed to pass through the through hole of the connecting piece to detachably connect with the clamping piece; the clamping piece is detachably connected with a top portion of the connecting piece.

7. The light body connecting structure according to claim 1, wherein light body connecting structure further comprises a support piece; a channel for the wire to pass through is defined in an interior of the support piece; at least two wiring ports are defined on an outer side of the support piece; the at least two wiring ports are communicated with the channel;

wherein the second end of the terminal body is detachably connected with the support piece; the one end of the wire respectively passes through the support piece and the second end of the terminal body to electrically connect with the plug assembly.

8. The light body connecting structure according to claim 7, wherein a mounting port matched with the support piece is defined on the second end of the terminal body; the terminal body is detachably connected with the support piece through the mounting port;

wherein the mounting groove defined on the first end of the terminal body is communicated with the mounting port; the mounting groove is configured to connect with the plug assembly;

when the support piece is connected with the mounting port, one of the at least two wiring ports, close to the terminal body, of the support piece is aligned with the mounting port, and a size of each of the at least two wiring ports is greater than a size of the mounting groove, so that the plug assembly is allowed to plug into the support piece from the one of the at least two wiring ports.

9. The light body connecting structure according to claim 7, wherein two ends of the wire are alternatively connected with the wiring terminal; the wire is integrally formed with the wiring plug of the wiring terminal.

10. A light group, comprising:

lampshades, light bodies respectively accommodated in the lampshades, and light body connecting structures according to claim 1;

wherein the lampshades defines openings, and each of the lampshades defines at least one opening; the light body connecting structures are matched with the openings of the lampshades; the wiring terminal of each of the light body connecting structures is connected with a corresponding opening on a corresponding lampshade; each wiring terminal is plugged into a corresponding light body in the corresponding lampshade, so that the light bodies are respectively fixed in the lampshades and the wiring terminal of each of the light body connecting structures is electrically connected with the corresponding light body;

each wiring terminal connected with the corresponding lampshade is connected with an opposite wiring terminal disposed on an adjacent lampshade, so that the light bodies are connected in series and the lampshades are connected in series.

11. The light group according to claim 10, wherein each of the lampshades is detachably connected with the opposite wiring terminal of the adjacent lampshade through a corresponding support piece; each wire between each of the lampshades and the adjacent lampshade is inserted into the corresponding support piece.

12. The light group according to claim 10, wherein each of the lampshades comprises an lampshade body, each lampshade body is integrally formed; an accommodating cavity is defined in each lampshade body; each of the light bodies is accommodated in each lampshade body; a plurality of openings communicated with the accommodating cavity are defined on each lampshade body; each wiring terminal is detachably connectable to each of the plurality of openings on each lampshade body.

13. The light group according to claim 10, wherein each of the light bodies comprises a light-emitting piece and power connecting plugs; the light-emitting piece thereof is accommodated in each lampshade body; the power connecting plugs thereof are matched with the wiring plug of each of the light body connecting structures; the power connecting plugs thereof comprise at least one wiring input terminal plug and at least one wiring output terminal plug; the at least one wiring input terminal plug thereof and the at least one wiring output terminal plug thereof are fixedly connected with the light-emitting piece thereof; a power supply input end of the light-emitting piece thereof is electrically connected with the at least one wiring input terminal plug thereof; a power supply output end of the light-emitting piece thereof is electrically connected with the at least one wiring output terminal plug.

14. The light group according to claim 13, wherein each light-emitting piece comprises a circuit board and lamp beads uniformly distributed on the circuit board.

15. The light group according to claim 13, wherein each light-emitting piece comprises a light strip and a support; each light strip is wrapped on an outer side of a corresponding support.

16. The light group according to claim 11, wherein the light group further comprises a stake; a last support piece disposed on a tail end of the light group is detachably connected with the stake; the stake is insertable into ground, so the light group is insertable into the ground.

17. The light group according to claim 11, wherein the light group further comprises a base; a last lampshade of the lampshades disposed on a tail end of the light group or a last support piece disposed on the tail end of the light group is detachably connected with the base.

18. An assembling method of a light group, comprising:

a step S1: mounting wiring terminals respectively on two ends of one of the wires;

a step S2: plugging a first wiring terminal disposed on a first end of a first wire of the wires into a first end of one of light bodies;

a step S3: inserting the one of the light bodies into one of lampshades from a first opening of openings of the one of the lampshades, and connecting the first wiring terminal of a first light body connecting structure of the light body connecting structures to the first opening of the one of the lampshades;

a step S4: adjusting a distance between a wiring plug of a second wiring terminal and a second end of the one of the light bodies through the second wiring terminal disposed on one end of a second wire of the wires, inserting the wiring plug of the second wiring terminal into a second opening of the openings of the one of the lampshades, aligning and abutting the wiring plug of the second wiring terminal against the second end of the one of the light bodies; connecting the second wiring terminal to the second opening of the openings of the one of the lampshades, and enabling the wiring plug of the second wiring terminal being completely plugged into the second end of the one of the light bodies; and a step S5: sequentially assembling other light bodies and other lampshades according to steps S1, S2, S3, and S4 to complete assembly of the light group.

19. The assembling method according to claim 18, wherein in the step S1, wiring plugs are respectively integrally formed with two ends of the one of the wires; a first wiring plug disposed on a first end of the one of the wires abuts against a top portion of a first connecting piece thereof after passing through a first terminal body thereof; and then a bottom portion of the first connecting piece thereof is connected with a mounting groove of the first terminal body thereof, similarly, a second wiring plug disposed on a second end of the one of the wires is mounted at a top portion of a second connecting piece thereof.

20. The assembling method according to claim 18, wherein the step S1 further comprises a step of mounting one of support pieces; the step of mounting the one of the support pieces comprises:

a step S1.1: respectively integrally forming the two ends of the one of the wires with two wiring plugs, and respectively mounting two terminal bodies on two ends of the one of the support pieces;

a step S1.2: passing a first terminal plug disposed at the first end of the one of the wires through a first terminal body and a second terminal body of the two terminal bodies thereof to enable the two wiring plugs respectively disposed on the two ends of the one of the wires being respectively exposed from the two terminal bodies;

a step S1.3: fixing the first wiring plug disposed on the first end of the one of the wires to a top portion of a first connecting piece of the first terminal body thereof, and connecting a bottom portion of the first connecting piece to a mounting groove of the first terminal body thereof; and a step S1.4: fixing the second wiring plug disposed on the second end of the one of the wires to a top portion of a second connecting piece of the second terminal body, inserting a portion of the one of the wires that is exposed outside into the one of the support pieces from a mounting groove of the second terminal body, and connecting a bottom portion of the second connecting piece to the mounting groove of the second terminal body thereof.

* * * * *